June 8, 1943.　　　　E. M. GREEN　　　　2,321,379
COMBINATION SCREW AND RIVET
Filed Nov. 3, 1942

INVENTOR.
BY EMMET M. GREEN
Kwis Hudson & Kent
ATTORNEYS

Patented June 8, 1943

2,321,379

UNITED STATES PATENT OFFICE 2,321,379

COMBINED SCREW AND RIVET

Emmet M. Green, Los Angeles, Calif.

Application November 3, 1942, Serial No. 464,347

7 Claims. (Cl. 85—46)

This invention relates to fasteners and aims to provide an improved fastener of the kind having the characteristics of both a screw and a rivet.

The present application discloses a threaded fastener which is an improvement over the combination screw and rivet of my earlier application, Serial No. 429,379, filed February 3, 1942, and in which improvement the backout-arresting shoulder formed adjacent the head is turned down, that is, away from the head of the fastener to more effectively prevent reentry of the thread in the work opening.

A further object of my invention is to provide a fastener of the kind referred to in which the end of the thread nearest the head varies from normal pitch to a reverse pitch to effectively prevent reentry of the thread in the work opening.

Other objects and advantages of the invention will be apparent from the following description when taken in conjunction with the accompanying sheet of drawings, in which.

Figure 1:
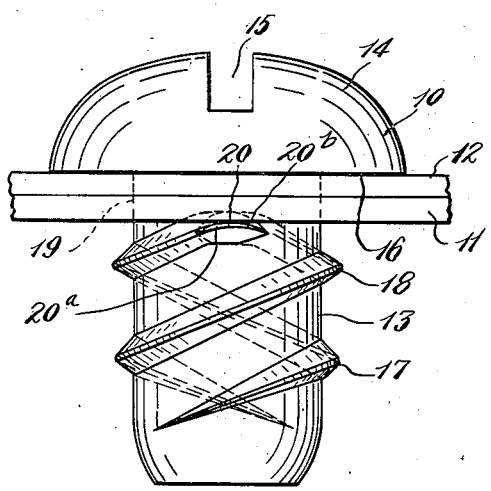
Fig. 1 is an elevation showing a fastener of my invention applied to a plurality of work pieces to be connected.

Before proceeding with a detailed description of the fasteners shown in the drawing, I wish to point out in a general way that my fastener can be used for a variety of different purposes where two or more plates or other parts are to be permanently connected or fastened together, and is especially useful for attaching or fasening purposes where one side of the work is inaccessible to riveting tools. As will be explained more in detail hereinafter, my fastener embodies a backout-arresting means which is shaped to effectively prevent removal of the fastener from the opening of the work to which it has been applied.

Figure 2:
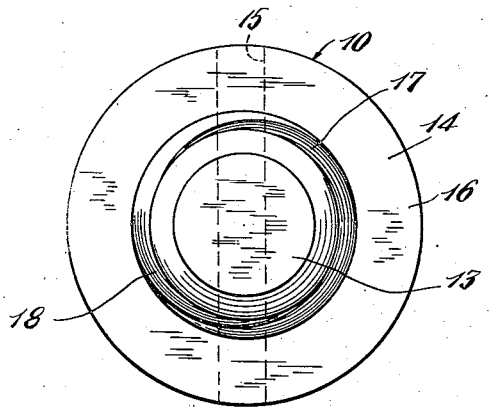
Fig. 2 is an end view of the fastener.

In Figs. 1 and 2 I show my improved fastener 10 applied to a pair of plates or elements 11 and 12 which are to be permanently connected. The fastener comprises a stem 13 having a head 14 thereon. The head may be of any desired shape or form, and in this instance is shown as being a round head having the usual screw driver slot 15 therein. The under side of the head provides a work-engaging face or clamping surface 16.

The stem 13 carries one or more helical threads, in this instance, two such threads 17 and 18, for advancing the fastener when rotated in a preformed opening 19 provided in the work pieces. The threaded stem 13 may be of any desired length and in this case is of a length such that each of the threads 17 and 18 may extend for a complete revolution or 360°. The threads 17 and 18 are preferably V-shaped in cross-section and have a relatively steep pitch to produce a rapid advancement of the stem in the opening 19 of the work during rotation of the fastener. The threads may be formed on the stem 13 in any suitable way such as by means of appropriate thread-rolling dies. The fastener, including the threads 17 and 18, is preferably hardened so as to enable the stem to cut its own threads during the rotation thereof in the work opening.

Figure 3:
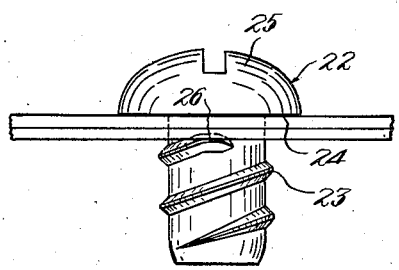
Fig. 3 is an elevation similar to Fig. 1 but showing another form of the fastener.

The upper ends of the threads 17 and 18 are stopped short of the head 14 and terminate with portions which extend part way around the stem 13 and form arcuate shoulders 20 which are spaced from the under surface 16 of the head and form both a work-clamping means and a backout-arresting means which prevents withdrawal or removal of the fastener from the work opening by reverse rotation. The axial distance which the shoulders 20 are spaced from the face 16 of the head is dependent upon the thickness of the work and is preferably such that when the face 16 is in engagement with the outer surface of the plate or element 12, the shoulders 20 will be in clamping engagement with the inner surface of the plate or element 11. In many cases the relation of the head and shoulder spacing to the work thickness will be such that the shoulders become more or less indented into or embedded in the work, as indicated in Figs. 1 and 3. Under these conditions there is greater likelihood of reengagement of the threads in the work opening during reverse rotation of the fastener, and to effectively prevent such reengagement I make the shoulders 20 of the form and shape hereinafter described.

The shoulders 20 are preferably formed as integral continuations of the threads 17 and 18 and include a section or portion 20a which is of substantially zero pitch and an end portion 20b which is of reverse pitch. The portion 20a of zero pitch extends substantially parallel with the face 16 of the head 14 and cooperates with such surface in producing a clamping or holding action on the work plates or elements 11 and 12. The portion 20b of reverse pitch is inwardly inclined, that is to say, curves away from the face 16 of the head so that even though the shoulders 20 have been indented into the work and the fastener is canted somewhat in the work opening, the threads will be effectively prevented from reengaging in such opening when the fastener is subjected to reverse rotation. It will therefore be seen that when the fastener has been fully driven or applied to the work, it will hold the work pieces in permanently connected relation in substantially the manner of a rivet and cannot be withdrawn from the work opening.

When my fastener is being used, it is only necessary to have access to the work from one side thereof, and this is an important advantage over riveting operations where access to both sides of the work is necessary. The hole 19 is first drilled through the work pieces 11 and 12, such hole preferably being a little larger in diameter than the stem 13. The stem of the fastener is then inserted into the opening and is driven thereinto substantially in the manner of an ordinary screw. During this driving operation, threads 17 and 18 cut their way in the edges of the opening of the work and advance the fastener axially to bring the surface 16 into engagement with the outer surface of the plate or element 12.

Since the backout-arresting shoulders 20 have a different pitch than the preceding portions of the threads 17 and 18, it will be seen that as these shoulders move across the edges of the work pieces and as they leave the opening, they will cause some of the metal of the work pieces to be deflected downwardly at the points where these shoulders emerge from the work. The continued rotation of the fastener after the shoulders 20 have emerged from the work will cause these shoulders to exert a camming or wiping action on the downwardly deflected portions of the work and will push such portions back, or nearly back, to the normal position which they occupied before being displaced by the shoulders. When this replacement or restoration of the displaced metal of the work has taken place, the fastener is fully driven and cannot be withdrawn by reverse rotation. The portions 20b of the backout-arresting shoulders 20 being curved away from the head face 16 will effectively prevent reengagement of the threads in the work opening 19 even though the metal displaced by the shoulders during the driving operation is not fully restored by the above-mentioned camming action.

In Fig. 3 I show a fastener 22 which is similar to the fastener 10 and serves a similar purpose. The fastener 22 differs from the fastener 10 in that it has a single thread 23 instead of a multiple thread. The single thread 23 may be of any suitable length, for example, may comprise two complete convolutions, as here shown. The upper end of the thread stops short of the under face 24 of the head 25 and terminates in a backout-arresting shoulder 26, which is of substantially the same form and serves the same purpose as the shoulders 20 above described.

From the foregoing description and the accompanying drawing, it will now be readily seen that I have provided a fastener having characteristics of both a screw and a rivet and in which a backout-arresting shoulder spaced from the head is of a shape such that it will effectively prevent withdrawal of the fastener from the work by reverse rotation.

While I have illustrated and described my improved fastener in considerable detail, it will be understood, of course, that I do not wish to be limited to the precise shapes and constructions herein disclosed, but regard my invention as including such changes and modifications as do not constitute a departure from the spirit of the invention and the scope of the appended claims.

Having thus described my invention, I claim:

1. A fastener of the character described, comprising a stem, a head on the stem, and a thread on the stem having an end portion forming an arcuate shoulder spaced from the head and inclined away from the head.

2. A fastener of the character described, comprising a stem, a head on the stem, and a thread on the stem having a section of substantially zero pitch spaced from the head to form an arcuate shoulder and an end section of reverse pitch.

3. A fastener of the character described adapted to be permanently secured in a work opening, comprising a stem having a head, and a screw thread on the stem terminating at its upper end in an arcuate shoulder spaced from the head, said shoulder varying from the normal thread pitch and through a zero pitch to a reverse pitch.

4. A fastener of the character described adapted to be permanently secured in a work opening, comprising a stem having a head, and a screw thread on the stem terminating at its upper end in an arcuate shoulder, said shoulder having a portion spaced from the head in accordance with the work thickness and an end portion inclined away from the head to prevent reengagement of the thread in said opening.

5. A fastener of the character described, comprising a hardened screw having a head and a V-thread, the portion of the thread adjacent the head being a smooth integral continuation providing an arcuate shoulder spaced from the head and varying through a zero pitch to a reverse pitch.

6. A fastener adapted to be permanently secured in a work opening, comprising a hardened screw having a head and a V-thread terminating at its upper end in an arcuate shoulder, said shoulder having a section spaced from the head in accordance with the work thickness and an end portion inclined away from the head to prevent reengagement of the thread in said opening.

7. A fastener of the character described, comprising a stem, a head on the stem, and multiple threads on the stem each terminating adjacent the head in a portion extending part way around the stem to form an arcuate shoulder which is spaced from the head and has its outer end inclined away from the head.

EMMET M. GREEN.